(12) United States Patent
Saijo et al.

(10) Patent No.: US 7,632,452 B2
(45) Date of Patent: Dec. 15, 2009

(54) METHOD FOR MANUFACTURING HONEYCOMB STRUCTURE

(75) Inventors: Takamitsu Saijo, Dunavarsany (HU); Kenichiro Kasai, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/940,123

(22) Filed: Nov. 14, 2007

(65) Prior Publication Data

US 2008/0174039 A1 Jul. 24, 2008

Related U.S. Application Data

(63) Continuation of application No. PCT/JP2006/304508, filed on Mar. 8, 2006.

(51) Int. Cl.
*B28B 1/00* (2006.01)

(52) U.S. Cl. .................... 264/630; 264/605; 294/65

(58) Field of Classification Search ............. 264/630, 264/631, 605; 294/65; 198/849
See application file for complete search history.

(56) References Cited

U.S. PATENT DOCUMENTS

| | | | |
|---|---|---|---|
| 3,033,382 A * | 5/1962 | Noble et al. ............. 212/281 |
| 4,274,779 A | 6/1981 | Longinotti | |
| 4,753,047 A | 6/1988 | Yoshikawa et al. | |
| 5,914,187 A | 6/1999 | Naruse et al. | |
| 6,217,093 B1 * | 4/2001 | Neutel et al. ............ 294/87.1 |
| 6,439,631 B1 * | 8/2002 | Kress ........................ 294/65 |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2004/0051196 A1 * | 3/2004 | Otsuka et al. ............. 264/41 |
| 2004/0161596 A1 | 8/2004 | Taoka et al. | |
| 2005/0109023 A1 | 5/2005 | Kudo et al. | |
| 2005/0153099 A1 | 7/2005 | Yamada | |

(Continued)

FOREIGN PATENT DOCUMENTS

DE 3023072 1/1982

(Continued)

*Primary Examiner*—Carlos Lopez
*Assistant Examiner*—Erin Snelting
(74) *Attorney, Agent, or Firm*—Ditthavong Mori & Steiner, P.C.

(57) ABSTRACT

A degreasing furnace loading apparatus including a molded body moving mechanism configured to move a plurality of ceramic molded bodies simultaneously, and a transporting table configured to transport a degreasing jig for mounting the ceramic molded bodies thereon to a degreasing furnace. The molded body moving mechanism is configured to simultaneously place the plurality of ceramic molded bodies on the degreasing jig, such that each of the ceramic molded bodies is placed to have predetermined intervals therebetween.

14 Claims, 6 Drawing Sheets

U.S. PATENT DOCUMENTS

| | | |
|---|---|---|
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0001349 A1* | 1/2007 | Muroi et al. ............ 264/605 |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0157445 A1 | 7/2008 | Kawai et al. |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237428 A1 | 10/2008 | Kobayashi et al. |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

FOREIGN PATENT DOCUMENTS

| | | | |
|---|---|---|---|
| DE | 3425165 | | 1/1986 |
| JP | 61075711 A | * | 4/1986 |
| JP | 3-035057 B | | 9/1986 |
| JP | 3-267688 | | 11/1991 |
| JP | 06137769 A | * | 5/1994 |
| JP | 8-187715 | | 7/1996 |
| JP | 9-255436 | | 9/1997 |
| JP | 10-026480 | | 1/1998 |
| JP | 10-167801 | | 6/1998 |
| JP | 2002-273131 | | 9/2002 |

* cited by examiner

A-A line cross-sectional view

METHOD FOR MANUFACTURING HONEYCOMB STRUCTURE

CROSS-REFERENCE TO RELATED APPLICATIONS

The present application claims priority under 35 U.S.C. §120 as a continuation application of PCT Application No. PCT/JP2006/304508, filed on Mar. 8, 2006, the contents of which are incorporated herein by reference in their entirety.

BACKGROUND OF THE INVENTION

1. Field of the Invention

The present invention relates to a degreasing furnace loading apparatus and a method for manufacturing a honeycomb structure.

2. Discussion of the Background

In recent years, particulates such as soot contained in exhaust gases that are discharged from internal combustion engines of vehicles, such as buses and trucks, and construction machines, have raised serious problems as contaminants harmful to the environment and the human body.

For this reason, various honeycomb filters using honeycomb structural bodies made of porous ceramics, which serve as filters that collect particulates in exhaust gases to purify the exhaust gases, have been proposed.

Conventionally, upon manufacturing such a honeycomb structure, first, a wet mixture is prepared by mixing ceramic powder, a binder and a dispersant solution or the like with one another. Moreover, the wet mixture is continuously extrusion-molded through a die, and the extruded molded body is cut into a predetermined length so that a rectangular pillar-shaped honeycomb molded body is manufactured.

Next, the resulting honeycomb molded body is dried, and predetermined cells are then sealing so that either one of ends of each cell is plugged by the plugging material layer.

The resulting honeycomb molded body that has been sealed is carried in a degreasing furnace, and a degreasing process is performed.

Next, a firing process is performed on the degreased honeycomb molded bodies so that a honeycomb fired body is manufactured.

Thereafter, a sealing material paste is applied to the side faces of the honeycomb fired body, and the honeycomb fired bodies are mutually bonded so that an aggregate of the honeycomb fired bodies in which a number of the honeycomb fired bodies are bound to one another by interposing the sealing material layers (adhesive layers) is manufactured. Next, the resulting aggregate of the honeycomb fired bodies is cut and machined into a predetermined shape, such as a cylindrical shape and an cylindroid column shape, by using a cutting tool or the like so that a honeycomb block is formed, and lastly, a sealing material paste is applied onto the periphery of the honeycomb block to form a sealing material layer (coat layer); thus, the manufacturing processes for the honeycomb structure are completed.

In the present specification, in any of the forms of the honeycomb molded body, honeycomb fired body and honeycomb structure (or honeycomb structured body), among faces forming the external shape, those to which cells are exposed are referred to as "end faces", and those faces other than the end faces are referred to as "side faces".

As one of apparatuses that transfer honeycomb fired bodies and the like manufactured in the respective processes of the manufacturing operation of a honeycomb structure to the next process, for example, JP-B 3-035057 has described a mount-type transferring apparatus for honeycomb structural products in which a honeycomb structural product is suction-held onto a porous suction plate having an aperture rate greater than the aperture rate of the aperture end face of the honeycomb structural product, by utilizing a pressure loss exerted when outside air passes through the through holes of the honeycomb structural product, and transferred by a movable arm to which the porous suction plate is attached.

The contents of JP-B 3-035057 are incorporated herein by reference in their entirety.

SUMMARY OF THE INVENTION

A degreasing furnace loading apparatus according to an embodiment of the present invention includes a molded body moving mechanism configured to move a plurality of ceramic molded bodies simultaneously, and a transporting table configured to transport a degreasing jig for mounting the plurality of ceramic molded bodies thereon to a degreasing furnace. The molded body moving mechanism is configured to simultaneously place the plurality of ceramic molded bodies on the degreasing jig, and the molded body moving mechanism is configured to place each of the plurality of ceramic molded bodies to have predetermined intervals therebetween.

In an embodiment of the degreasing furnace loading apparatus of the present invention, the molded body moving mechanisms includes a plurality of grabbing mechanisms capable of moving the plurality of ceramic molded bodies simultaneously, and the plurality of grabbing mechanisms are desirably installed in parallel with one another.

Moreover, in an embodiment of the degreasing furnace loading apparatus of the present invention, the molded moving mechanism includes a plurality of lift mechanisms capable of moving the plurality of ceramic molded bodies simultaneously, and the plurality of lift mechanisms are desirably installed in parallel with one another.

In an embodiment of the degreasing furnace loading apparatus of the present invention, the molded body moving mechanism desirably includes an arm having a suction mechanism capable of suction-holding the plurality of ceramic molded bodies simultaneously. Moreover, the suction mechanism is desirably configured to provide a suction force of at least about 0.4 kPa and at most about 2.0 kPa to each of the plurality of ceramic molded bodies. Moreover, the suction mechanism is desirably configured to section-hold a suction face of each ceramic molded body of the plurality of ceramic molded bodies that is a side face of the ceramic molded body.

In an embodiment of the degreasing furnace loading apparatus of the present invention, the molded body moving mechanism desirably includes a cushioning member at a contact portion with each of the plurality of ceramic molded bodies. Moreover, the cushioning member is desirably made of a material selected from urethane resin, polyethylene resin, polypropylene resin, polystyrene resin, rubber, and epoxy resin. Moreover, the cushioning member is desirably attached to an entire contact face of the contact portion.

A method for manufacturing a honeycomb structure in accordance with an embodiment of the present invention includes forming a pillar-shaped honeycomb molded body having a plurality of cells longitudinally placed in parallel with one another with a partition wall therebetween by molding a ceramic raw material, carrying the honeycomb molded body into a degreasing furnace by using a degreasing furnace loading apparatus, degreasing the honeycomb molded body in the degreasing furnace, and firing the degreased honeycomb molded body so that a honeycomb structure comprising a honeycomb fired body is manufactured. The degreasing furnace loading apparatus includes a molded body moving mechanism capable of moving a plurality of honeycomb molded bodies simultaneously and a transporting table that transports a degreasing jig for mounting the honeycomb molded bodies thereon to the degreasing furnace. Further, the carrying of the honeycomb molded body into a degreasing furnace includes placing the plurality of honeycomb molded bodies simultaneously on the degreasing jig using the molded body moving mechanism, each of said the plurality of honeycomb molded bodies being placed to have predetermined intervals therebetween, and transporting the degreasing jig into the degreasing furnace using the transporting table.

In an embodiment of the method for manufacturing a honeycomb structure of the present invention, the molded body moving mechanism includes a plurality of grabbing mechanisms capable of moving the plurality of honeycomb molded bodies simultaneously, and the plurality of grabbing mechanisms are desirably installed in parallel with one another.

Moreover, in an embodiment of the method for manufacturing a honeycomb structure of the present invention, the molded body moving mechanism includes a plurality of lift mechanisms capable of moving the plurality of honeycomb molded bodies simultaneously, and the plurality of lift mechanisms are desirably installed in parallel with one another.

In an embodiment of the method for manufacturing the honeycomb structure, the molded body moving mechanism desirably includes an arm having a suction mechanism capable of suction-holding the plurality of honeycomb molded bodies simultaneously. Moreover, the suction mechanism can provide a suction force of at least about 0.4 kPa and at most about 2.0 kPa to each of the plurality of honeycomb molded bodies. Moreover, a suction face of each honeycomb molded body of the plurality of honeycomb molded bodies on which the suction mechanism works is desirably a side face of the honeycomb molded body.

In an embodiment of the method for manufacturing a honeycomb structure of the present invention, the molded body moving mechanism desirably includes a cushioning member at a contact portion with each of the plurality of honeycomb molded bodies. Moreover, the cushioning member is desirably made of a material selected from urethane resin, polyethylene resin, polypropylene resin, polystyrene resin, rubber, and epoxy resin.

In an embodiment of the method for manufacturing a honeycomb structure of the present invention, the cushioning member is attached to an entire contact face of the contact portion.

In an embodiment of the method for manufacturing a honeycomb structure of the present invention, upon placing the plurality of honeycomb molded bodies on the degreasing jig, desirably, an interval between each of the honeycomb molded bodies is at least about 3 mm and at most about 10 mm.

In an embodiment of the method for manufacturing a honeycomb structure of the present invention, the firing is desirably carried out in a state that the degreased honeycomb molded body is placed on the degreasing jig.

Moreover, in an embodiment of the method for manufacturing a honeycomb structure of the present invention, the honeycomb molded body is desirably a pillar-shaped honeycomb molded body having a plurality of cells longitudinally placed in parallel with one another with a partition wall therebetween. Moreover, the honeycomb molded body has desirably predetermined cells filled with a plug material paste and then plugged.

In an embodiment of the method for manufacturing a honeycomb structure of the present invention, the honeycomb structure is desirably formed by a plurality of honeycomb fired bodies combined with one another by interposing a sealing material layer.

In an embodiment of the method for manufacturing a honeycomb structure of the present invention, the honeycomb structure is desirably formed by a single piece of the honeycomb fired body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
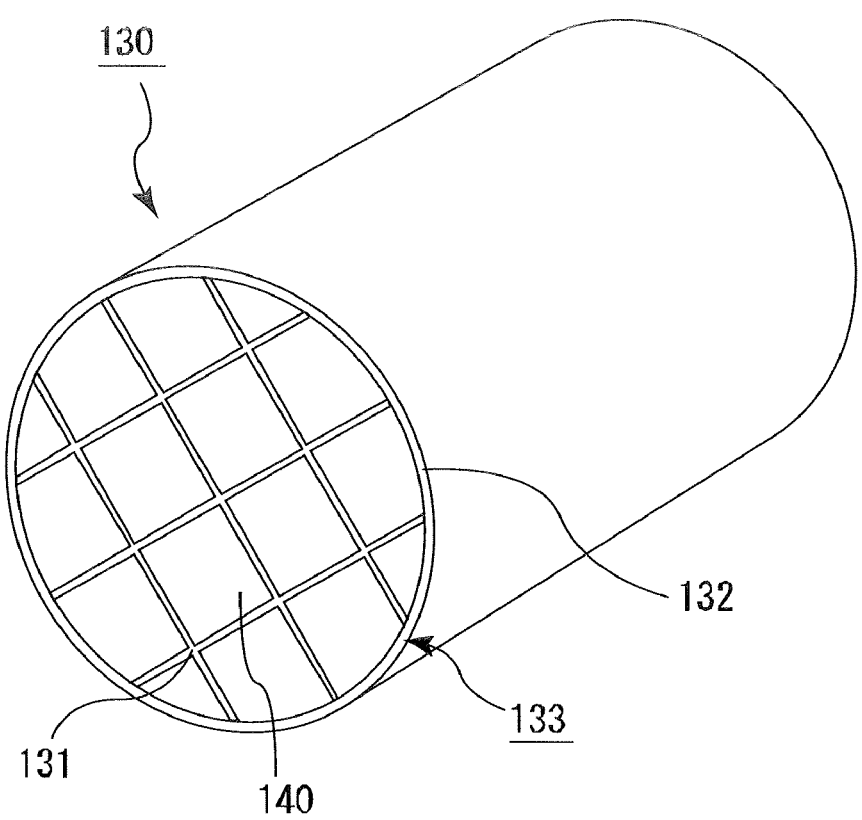
FIG. 1 is a perspective view that schematically shows one example of a honeycomb structure in accordance with an embodiment of the present invention.

The embodiments will now be described with reference to the accompanying drawings, wherein like reference numerals designate corresponding or identical elements throughout the various drawings.

The degreasing furnace loading (or carry-in) apparatus in accordance with an embodiment of the present invention includes a molded body moving mechanism capable of moving a plurality of ceramic molded bodies simultaneously, and transporting table that transports a degreasing jig for mounting the ceramic molded bodies thereon to a degreasing furnace, where the molded body moving mechanism simultaneously places the plurality of ceramic molded bodies on the degreasing jig, and each of the ceramic molded bodies is placed to have predetermined intervals therebetween.

Since the degreasing furnace loading apparatus in accordance with the embodiment of the present invention is provided with the molded body moving mechanism capable of moving a plurality of ceramic molded bodies simultaneously, the necessity of preparing any additional process, apparatus and the like required for placing ceramic molded bodies on a degreasing jig under the same conditions tends not to arise, a plurality of ceramic molded bodies tends to be moved at one time. In addition, the ceramic molded bodies are easily placed to have predetermined intervals between each of them so that the ceramic molded bodies are more likely to be degreased under the same conditions.

Therefore, in the degreasing-furnace loading process of carrying out degreasing processes in the furnace, since the ceramic molded bodies tend to be carried in quickly and efficiently, it may become easier to improve the working efficiency and also to cut costs, as well as preventing occurrence of variations (deviations) in the required quality.

The method for manufacturing a honeycomb structure in accordance with an embodiment of the present invention is a method for manufacturing a honeycomb structure, including: forming a pillar-shaped honeycomb molded body having a plurality of cells longitudinally placed in parallel with one another with a partition wall therebetween by molding a ceramic raw material; degreasing the honeycomb molded body by carrying the honeycomb molded body into a degreasing furnace by using a degreasing furnace loading apparatus; and firing the degreased honeycomb molded body so that a honeycomb structure including a honeycomb fired body is manufactured. The degreasing furnace loading apparatus includes a molded body moving mechanism capable of moving a plurality of honeycomb molded bodies simultaneously, and a transporting table that transports a degreasing jig for mounting the ceramic molded bodies thereon to a degreasing furnace. The method for manufacturing a honeycomb structure further includes placing the plurality of honeycomb molded bodies simultaneously on the degreasing jig using the molded body moving mechanism, where each of the honeycomb molded bodies is placed to have predetermined intervals therebetween, and transporting the degreasing jig using the transporting table to carry out the degreasing.

In the present specification, the shape indicated by the word "pillar" refers to any desired shape of a pillar including a round pillar, an oval pillar, a polygonal pillar and the like.

Moreover, in the method for manufacturing a honeycomb structure in accordance with the embodiments of the present invention, since, upon carrying the honeycomb molded body into a degreasing furnace, a plurality of the honeycomb molded bodies are simultaneously placed on a degreasing jig to have predetermined intervals therebetween, that is, since a plurality of the honeycomb molded bodies are placed on the degreasing jig under the same conditions, the degreasing process tends to be carried out under the same conditions; thus, it may become easier to shorten time required for the loading process to the degreasing furnace, and also to efficiently achieve uniform quality and the like.

First, referring to the drawings, the following description will discuss a degreasing furnace loading apparatus in accordance with the embodiments of the present invention.

The degreasing furnace loading apparatus in accordance with the embodiments of the present invention has the molded body moving mechanism and the transporting table. The following description will discuss the molded body moving mechanism.

With respect to the molded body moving mechanism, not particularly limited as long as it can move a plurality of ceramic molded bodies simultaneously, and, for example, a mechanism in which a plurality of grabbing mechanisms are installed in parallel with one another, or a mechanism in which suction mechanisms are installed in parallel with one another, or a mechanism in which lift mechanisms are installed in parallel with one another or the like, may be used. Any of these mechanisms may be adopted as a mechanism including the molded body moving mechanism with appropriate design changes.

In the degreasing furnace loading apparatus in accordance with the embodiments of the present invention, the molded body moving mechanism desirably includes an arm including a suction mechanism capable of suction-holding a plurality of ceramic molded bodies simultaneously.

The ceramic molded bodies tends to be moved by the suction mechanism without causing any damage thereto, and since the arm is installed, it may become easier to improve the degree of freedom in moving the ceramic molded bodies, and consequently to move the ceramic molded bodies in a desired layout form without causing any damage or the like thereto.

The following description will discuss in detail the degreasing furnace loading apparatus in accordance with the embodiments of the present invention in which an arm including a suction mechanism is installed in the molded body moving mechanism.

First, referring to the drawings, the honeycomb structure in accordance with the embodiments of the present invention that is manufactured by using the degreasing furnace loading apparatus in accordance with the embodiments of the present invention will be described.

Figure 2A:
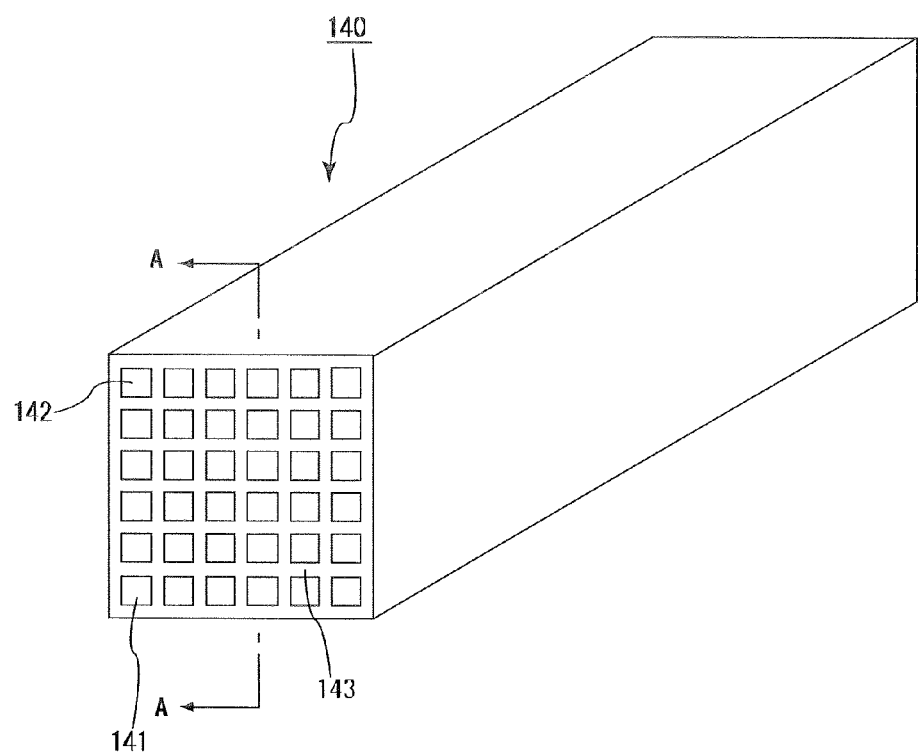
FIG. 2A is a perspective view that schematically shows a honeycomb fired body configuring the honeycomb structure in accordance with an embodiment of the present invention.

FIG. 1 is a perspective view that schematically shows one example of such a honeycomb structure in accordance with one embodiment of the present invention. FIG. 2A is a perspective view that schematically shows a honeycomb fired body used for forming the honeycomb structure in accordance with one embodiment of the present invention, and FIG. 2B is a cross-sectional view taken along line A-A of FIG. 2A.

Figure 2B:
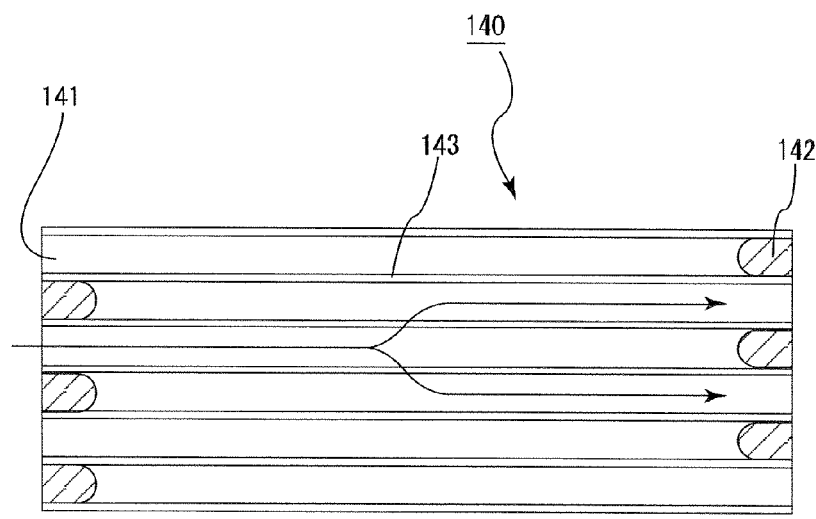
FIG. 2B is a cross-sectional view taken along line A-A of FIG. 2A.

In the honeycomb structure 130, a plurality of honeycomb fired bodies 140 shown in FIGS. 2A and 2B are bound to one another by interposing sealing material layers (adhesive layers) 131 to form a ceramic block 133, and a sealing material layer (coat layer) 132 is further formed on the periphery of this ceramic block 133.

Moreover, as shown in FIGS. 2A and 2B, the honeycomb fired body 140 has a plurality of cells 141 longitudinally placed in parallel with one another, so that each cell wall 143 that separates the cells 141 is allowed to function as a filter.

In other words, as shown in FIG. 2B, each of the cells 141, formed in the honeycomb fired body 140, is sealed with a plugging material layer 142 at either one of ends on its exhaust-gas inlet side and outlet side so that exhaust gases that have entered one cell 141 are discharged from another cell 141 after having always passed through each cell wall 143 that separates the cells 141; thus, when exhaust gases pass through the cell wall 143, particulates are captured by the cell wall 143 so that the exhaust gases are purified.

Figure 3:
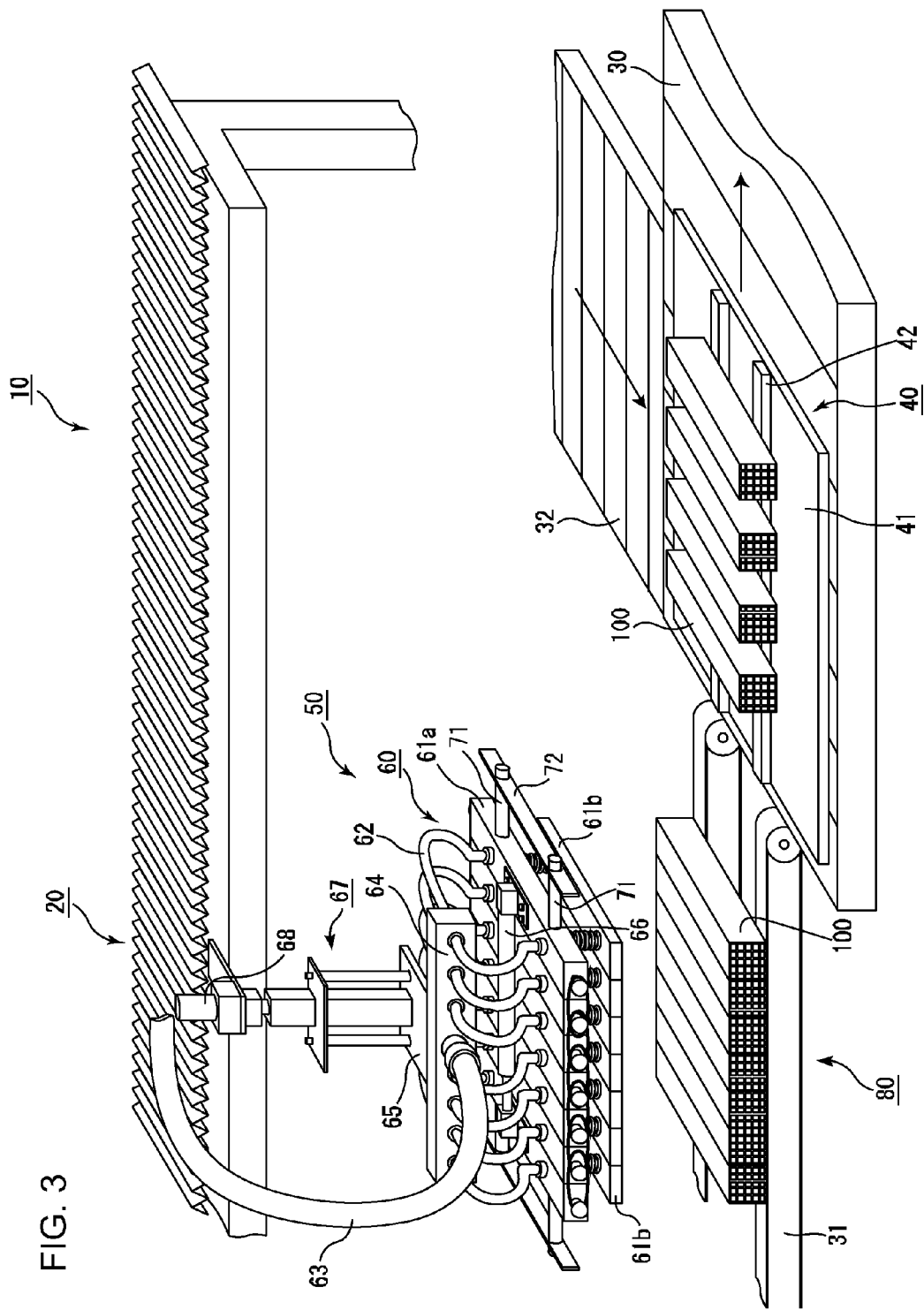
FIG. 3 is a perspective view that schematically shows one example of a degreasing furnace loading apparatus in accordance with an embodiment of the present invention.

Referring to FIG. 3, the following description will discuss in detail the degreasing furnace loading apparatus in accordance with the embodiments of the present invention in which an arm including a suction mechanism is installed in the molded body moving mechanism. However, the structure of the molded body moving mechanism is not intended to be limited to the specific embodiment shown in FIG. 3.

Here, with respect to the object to be moved by the molded body moving mechanism, the kind thereof is not particularly limited as long as it is a ceramic molded body that needs a degreasing process, and the object may be a honeycomb molded body for manufacturing honeycomb fired bodies that has been described in FIGS. 1, 2A, and 2B, or may be another ceramic molded body. The following explanation will be given by exemplifying the honeycomb molded body for manufacturing honeycomb fired bodies described in FIGS. 1, 2A, and 2B as a ceramic molded body.

FIG. 3 is a perspective view that schematically shows one example of an embodiment of a degreasing furnace loading apparatus in accordance with one embodiment of the present invention.

As shown in FIG. 3, an arm 50, which forms a molded body moving mechanism 20, includes a suction mechanism 60, and in the suction mechanism 60, seven suction members 61a and seven suction plates 61b are placed in parallel with each other so as to be made face to face with each other in the horizontal direction. A suction hole (not shown) is formed in each suction plate 61b placed on the lower side so as to exert a suction force onto a ceramic molded body 100. On the other hand, tube connecting holes are formed at two positions on the upper portion of each suction member 61a on the upper side, and tubes 62 are respectively connected thereto through the tube connecting holes. These tubes 62 are collected into a rectangular pillar-shaped tube distribution member 64 having a cave inside thereof. Moreover, an air suction duct 63 is connected to the tube distribution member 64, and this air suction duct 63 is connected to a suction device (not shown).

With respect to the flow of the suction force (suction air) in the suction mechanism 60, a suction force, generated in the suction device, is transmitted to the tube distribution member 64 through the air suction duct 63, and then transmitted to the respective suction members 61a through the tubes 62 collected into the tube distribution member 64. In this manner, the suction force, generated in the suction device, is not directly transmitted to the respective suction members 61a, but indirectly transmitted thereto after having once passed through the tube distribution member 64; therefore, all the suction forces transmitted to the respective suction members 61a tend to become equal to one another.

Moreover, a spring and a tube are sandwiched between the suction member 61a and the suction plate 61b so as to couple the suction member 61a and the suction plate 61b to each other. In this manner, the suction force from the tube 62 is transmitted to the suction member 61a, and further transmitted to the suction holes formed in the suction plate 61b through the tube sandwiched between the suction member 61a and the suction plate 61b. The suction mechanism 60 suction-holds the ceramic molded body 100 by utilizing the suction force thus transmitted to the suction holes.

Here, in the present specification, the suction force refers to a pressure difference between the inside of the suction system and the outside thereof in the suction mechanism.

Moreover, a supporting plate 65 supporting the suction mechanism 60 is attached to a side face of the tube distribution member 64, and an elevating mechanism 67, prepared as a cylinder and the like, is perpendicularly installed on the supporting plate 65, and by driving the elevating mechanism 67, the suction mechanism 60 may be raised and lowered more easily.

Here, a member that supports the arm 50 installed on the upper portion of the elevating mechanism 67 in the horizontal direction is threadably engaged with a ball screw, not shown, so that, for example, by rotating the ball screw, the arm 50 can be shifted in the horizontal direction. With respect to the arm moving device that shifts the arm horizontally, not limited to the ball screw, for example, a crane that can move horizontally along a rail may be used. Moreover, a revolution mechanism 68 is connected to the further upper portion of the member supporting the arm 50 so that the suction mechanism 60 is allowed to rotate.

Figure 4A:
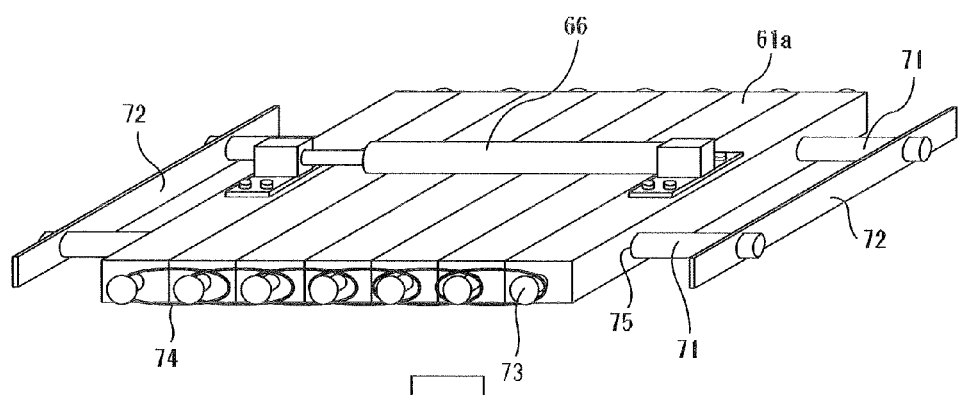
FIG. 4A is a perspective view that shows a state in which the interval between each of suction members in accordance with an embodiment of the present invention is made shortest.
Figure 4B:
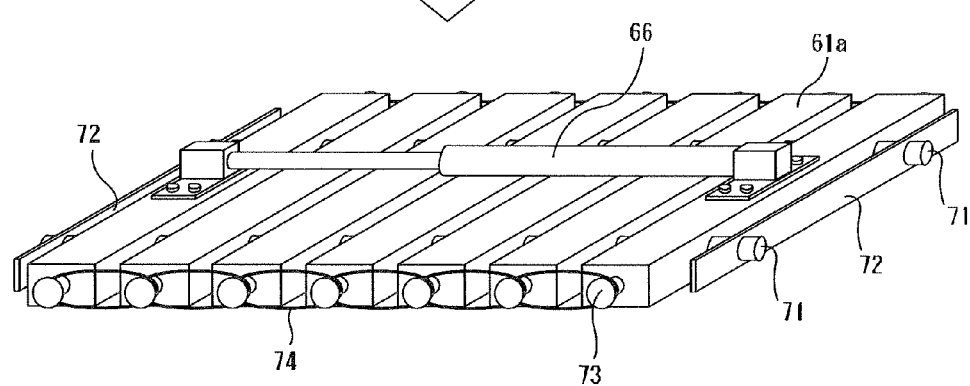
FIG. 4B is a perspective view that shows a state in which the interval between each of suction members in accordance with one embodiment of the present invention is made longest.

Referring to FIGS. 4A and 4B, the following description will discuss a mechanism used for adjusting the interval between each of the suction members 61a.

FIG. 4A is a perspective view that shows a state in which the interval between each of suction members 61a in accordance with one embodiment of the present invention is made shortest; and FIG. 4B is a perspective view that shows a state in which the interval between each of suction members 61a in accordance with one embodiment of the present invention is made longest. Here, the suction members 61b are omitted from FIGS. 4A and 4B.

As shown in FIGS. 4A and 4B, through holes 75, which penetrate each suction member 61a in the horizontal direction, are formed at two positions of each of the seven suction members 61a. Moreover, two supporting shafts 71 are inserted through all the through holes 75 at the two positions in a manner so as to penetrate the seven suction members 61a. The two ends of each of the two supporting shafts 71 are secured to two plate-shaped supporting shaft coupling pates 72 so that the seven suction members 61a are combined into one set, and allowed to function like a single big plate with its width being changed within a predetermined range.

Moreover, nail-shaped hooking portions 73 are formed on the two ends of each suction member 61a, and with adjacent two of the hooking portions 73 being formed into one set, a binding ring 74 is hooked on them for each set. By the binding ring 74 that has been hooked on each of the sets, their movable ranges of all the adjacent suction members 61a are determined.

The two end portions of a driving device 66 to be used for adjusting the intervals are secured to the upper faces of the suction members 61a located on the two ends among the seven suction members 61a placed side by side so that the intervals of the suction members 61a tend to be adjusted by this driving device 66.

In other words, when the length of the driving device 66 is made shortest, the suction members 61a are mutually made in contact with one another completely; in contrast, when the length of the driving device 66 is made longest, the interval between each of the mutual suction members 61a is made longest within the expandable range of the binding ring 74. Thus, the mutual intervals between each of the suction members 61a are determined in two states, that is, the longest length and the shortest length adjusted by the driving device 66. In this case, by adjusting the expandable range of the binding ring 74, the intervals between each of the mutual suction members 61a tend to be adjusted.

In the case where the binding ring 74 is formed by an elastic member such as rubber, the suction members 61a tend to be expanded at equal intervals within a range in which the binding ring 74 can be extended, regardless of the length of the driving device 66.

In other words, in the case where the binding ring 74 is made of an elastic member also, the intervals between the mutual suction members 61a are extended and shrunk by the extending and shrinking operations of the driving device 66. At this time, since the binding ring 74 is hooked on the hooking portions 73 of the adjacent suction members 61a, and since the adjacent suction members 61a are biased by the same force in the mutually approaching directions by the elastic force of the binding ring 74, the suction members 61a are expanded in a manner so as to have mutually equal intervals therebetween. Therefore, within the expandable range of the binding ring 74, the suction members 61a tend to be mutually extended with equal intervals in a desired state of the driving device 66 having the length between the shortest length and the longest length.

With respect to the constituent material for the binding ring 74, not particularly limited, examples thereof include: metals such as aluminum, stainless steel, copper, iron and nickel;

rubbers such as silicone rubber, natural rubber, synthetic rubber and fluororubber; and resins such as PS resin, ABS resin, POM resin, PC resin, PP resin, PE resin, PPE resin and PBT resin.

Here, the binding ring has been explained as the mechanism for adjusting the mutual intervals between each of the suction members 61a; however, not limited to this, a spring may be interposed between the adjacent suction members 61a so as to carry out the adjustments, or a cylindrical member, which is flexible and configured by cylinders having different diameters that are fitted to each other, may be interposed so as to carry out the adjustments. In this manner, any desired member may be used as long as the mutual intervals between each of the suction members 61a can be adjusted.

Referring to FIG. 3, the following description will discuss the transporting table 30.

The transporting table 30 is arranged as any desired transporting mechanism, such as a conveyor like a belt conveyor and a chain conveyor and a cart that travels on rails. Moreover, the degreasing jig 40 includes a molded body placing plate 41 and a mat 42, and each ceramic molded body 100 is mounted on the degreasing jig 40 through the mat 42 made of carbon fibers and the like. The transporting table 30 transports the degreasing jig in a direction indicated by an arrow in FIG. 3, and after ceramic molded bodies 100 have been mounted thereon, the degreasing jig 40 is transported to a degreasing furnace (not shown).

In the degreasing furnace loading apparatus 10 provided with the molded body moving mechanism 20 and the transporting table 30 having the structure as described above, the plurality of ceramic molded bodies 100 are simultaneously placed on the degreasing jig 40 by the molded body moving mechanism 20 to have predetermined intervals therebetween.

The interval between each of the ceramic molded bodies is not generally determined because they are dependent on the size of the ceramic molded bodies, the degreasing temperature, the degreasing time and the like. Here, when the interval is not too wide, the degreasing process tends not to progresses excessively, while when the interval is not too narrow, the degreasing process tends not to become insufficient. When the degreasing process progresses sufficiently, the resulting degreased body tends not to have variations (deviations) in the strength.

Referring to FIG. 3, the following description will discuss a sequence of processes in which honeycomb molded bodies are placed on the degreasing jig 40.

First, when ceramic molded bodies 100, obtained through the preceding processes, are transported by a conveyor 31, these are collected in a molded body receiving unit 80. As shown in FIG. 3, in the molded body receiving unit 80, the ceramic molded bodies 100 are positioned in a manner so as to be made in contact with one another.

Next, the suction mechanism 60 having seven sets in which each of sets is configured by the suction member 61a and the suction plate 61b is lowered so that the side face (upper face in the drawing) of each ceramic molded body 100 is made in contact with each suction plate 61b. Since the spring is interposed between the suction member 61a and the suction plate 61b, it may become easier to alleviate an impact upon contacting. At this time, the length of the driving device 66, which adjusts the interval between each of the suction members 61a is maintained in the shortest state so that each suction plate 61b is made in contact with the side face of each ceramic molded body. Then, an air suction process is carried out by activating a suction device, not shown, so that the ceramic molded body 100 is suction-held on the suction plate 61b through the suction holes formed in the suction plate 61b.

Thereafter, the suction mechanism 60 is raised to a predetermined position by the elevating mechanism 67, and the arm 50 is shifted in the horizontal direction above the degreasing jig 40 by the arm moving mechanism.

Next, the driving device 66 is activated so that the intervals of the seven suction members 61a are adjusted to predetermined intervals suitable for the degreasing process of the ceramic molded bodies 100. Thus, the intervals between each of the ceramic molded bodies 100 are made equal to one another. Here, the predetermined interval suitable for the degreasing process may be properly changed and determined depending on the kind and the number of the ceramic molded bodies 100.

Thereafter, in order to place the ceramic molded bodies 100 on the degreasing jig 40 positioned on the transporting table 30, the elevating mechanism 67 is activated to lower the suction mechanism 60. The descending of suction mechanism 60 is stopped when the ceramic molded bodies 100 come into contact with the mats 42, and the suction operation of the suction device is then stopped so that the ceramic molded bodies 100 are simultaneously mounted on the degreasing jig 40 through the mats 42. Since the mats 42 are made of carbon fibers and the like, the ceramic molded bodies 100 tend to be simultaneously placed on the degreasing jig 40 without causing damage thereto, when the ceramic molded bodies 100 are mounted on the degreasing jig 40.

As described above, since the intervals between each of the seven suction members 61a are adjusted prior to the descending operation of the suction mechanism 60, the ceramic molded bodies 100 are placed on the degreasing jig 40 to have intervals suitable for the degreasing process therebetween.

After the ceramic molded bodies 100 have been placed on the degreasing jig 40 to have intervals therebetween, the transporting table 30 is operated in a direction indicated by the arrow so that the degreasing jig 40 is transported to the degreasing furnace.

By carrying out the above-mentioned sequence of processes, the loading operation into the degreasing furnace of the ceramic molded bodies by the use of the degreasing furnace loading apparatus in accordance with the embodiments of the present invention is completed. Here, a new degreasing jig is transported to the position of the transporting table 30 by a table 32 so as to successively mount ceramic molded bodies thereon.

As shown in FIG. 3, in the above-mentioned molded body moving mechanism 20, the layout direction of the ceramic molded bodies 100 at the time when they are transported by the conveyor 31 and the layout direction of the ceramic molded bodies 100 mounted on the degreasing jig 40 are made the same. However, by activating the revolution mechanism 68, the arm 50 can be rotated, and, for example, after having been rotated by 90°, the ceramic molded bodies 100 may be placed on the degreasing jig 40. The rotation angle can be altered on demand.

In the molded body moving mechanism 20, the suction face of each ceramic molded body 100 on which the suction mechanism 60 works is desirably not an end face of the ceramic molded body 100, but as a side face thereof.

The ceramic molded body 100 prior to the degreasing process is soft; therefore, when the suction plate 61b is made in contact with the end face to carry out a suction process, the end face might be deformed or damaged. In the molded body moving mechanism 20, since the suction face of each ceramic molded body 100 on which the suction mechanism 60 works is not an end face of the ceramic molded body 100, but a side face thereof, it may become easier to carry out the moving operation efficiently without causing deformations, damages and the like to the end face.

In particular, in the honeycomb molded body, the side face has a wider area than the end face so that the suction-holding operation is easily carried out, and since, in an attempt to suction-hold its end face, air is continuously sucked through cells, it is difficult to carry out the suction-holding operation.

The arm 50 according to the above-mentioned embodiment includes the suction mechanism 60 in which seven sets of suction members 61a and suction plates 61b having suction holes at two positions, are placed side by side; however, the number of the sets of the suction members 61a and suction plates 61b is not limited to seven, and the number thereof may be set at a desired number of 2 sets or more. However, in an attempt to lift a number of ceramic molded bodies 100 at one time and effectively rearrange efficiently at predetermined intervals therebetween, the number is desirably set at 3 to 10.

The suction force of the arm including the suction mechanism to each ceramic molded body is desirably at least about 0.4 kPa and at most about 2.0 kPa.

When the suction force is about 0.4 kPa or more, the suction force does not become too weak and it may become easier to surely suction-hold and lift the ceramic molded body; in contrast, when the suction force is about 2.0 kPa or less, the strength of the ceramic molded body tends to resist the suction force, and it may become less likely to impart damages thereto.

The suction force used for suction-holding the ceramic molded body can be properly altered depending on the weight and shape of the ceramic molded body to be suction-held, and for example, in the case where the suction face of the ceramic molded body is a plane and the weight thereof is approximately 210 g, it is desirably at least about 0.7 kPa and at most about 2.0 kPa.

The molded body moving mechanism desirably includes a cushioning member at a contact portion to the ceramic molded body.

Since the ceramic molded body is in a state obtained by molding a ceramic material, and optionally drying the obtained molded body, it is soft and easily deformed. Therefore, when the molded body moving mechanism includes the cushioning member at the contact portion to the ceramic molded body, it may become easier to effectively prevent damage, deformation and the like to the ceramic molded body at the time of contacting or carrying out a suction process.

With respect to the cushioning member, not particularly limited as long as it has a cushioning function, examples of material thereof include: urethane resin, polyethylene resin, polypropylene resin, polystyrene resin, rubber, epoxy resin and the like. Among these, urethane resin is desirably used.

When the cushioning member is made of urethane resin, it may become easier to effectively suppress an impact occurring upon contact between the suction plate and the ceramic molded body, and consequently to prevent damage or deformation to the ceramic molded body.

Moreover, the cushioning member, made of any of these materials, may be a dense material or a foamed material.

The entire portion of the cushioning member may be made of the above-mentioned materials, or may have a structure in which a sheet-shaped member made of the above-mentioned materials is stuck onto a base member made of metal, resin or a ceramic material.

Here, the attaching position of the cushioning member to the suction plate 61b desirably covers the entire contact face to the ceramic molded body (except for the portion of each suction hole). This arrangement may make it easier to effectively prevent an unexpected damage to the ceramic molded body. Here, with respect to the cushioning member, a porous cushioning member may be used, and in this case, the cushioning member may be attached to the entire contact face including the suction holes.

The following description will discuss the method for manufacturing the honeycomb structure in accordance with the embodiments of the present invention successively in the order of processes.

Here, the following description will exemplify manufacturing processes of a honeycomb structure in which the honeycomb structure, which is mainly composed of silicon carbide as a constituent material, is formed by using powder of silicon carbide serving as a ceramic material.

Of course, the main component of constituent materials for the honeycomb structure is not intended to be limited to silicon carbide, and, other examples thereof include: nitride ceramic materials, such as aluminum nitride, silicon nitride, boron nitride and titanium nitride, carbide ceramic materials, such as zirconium carbide, titanium carbide, tantalum carbide and tungsten carbide, and oxide ceramic materials, such as alumina, zirconia, cordierite, mullite, and aluminum titanate, and the like.

Among these, non-oxide ceramic materials are desirably used, and in particular, silicon carbide is more desirably used. Silicon carbide is used because of its superior heat resistant property, mechanical strength, thermal conductivity and the like. Here, materials, such as a silicon-containing ceramic material formed by blending metal silicon in the above-mentioned ceramic material and a ceramic material that is combined by silicon or a silicate compound, may also be used as the constituent materials, and among these, a material in which metal silicon is blended in silicon carbide (silicon-containing silicon carbide) is desirably used.

First, inorganic powder serving as a ceramic material, such as silicon carbide powders having different average particle sizes, and an organic binder are dry-mixed to prepare mixed powder, and a liquid-state plasticizer, a lubricant and water are mixed to prepare a mixed liquid, and the mixed powder and the mixed liquid are mixed by using a wet-mixing device so that a wet mixture for use in manufacturing a molded body is prepared.

With respect to the particle size of silicon carbide powder, although not particularly limited, the silicon carbide powder that tends not to cause the case where the size of the honeycomb structure manufactured by the following firing treatment becomes smaller than that of the honeycomb molded body after degreased is desirable, and for example, mixed powder, prepared by combining 100 parts by weight of powder having an average particle size of at least about 0.3 μm and at most about 50 μm with at least about 5 parts by weight and at most about 65 parts by weight of powder having an average particle size of at least about 0.1 μm and at most 1.0 μm, is desirably used.

In order to adjust the pore diameter and the like of the honeycomb fired body, it is necessary to adjust the firing temperature, and the pore diameter can be adjusted by adjusting the particle size of the inorganic powder.

With respect to the above-mentioned organic binder, not particularly limited, examples thereof include: methyl cellulose, carboxymethyl cellulose, hydroxyethyl cellulose, polyethylene glycol and the like. Among these, methyl cellulose is desirably used.

In general, the blending amount of the above-mentioned binder is desirably at least about 1 part by weight and at most 10 parts by weight with respect to 100 parts by weight of the inorganic powder.

With respect to the above-mentioned plasticizer, not particularly limited, for example, glycerin and the like may be used.

Moreover, with respect to the lubricant, not particularly limited, for example, polyoxyalkylene-based compounds, such as polyoxyethylene alkyl ether and polyoxypropylene alkyl ether, may be used.

Specific examples of the lubricant include: polyoxyethylene monobutyl ether and polyoxypropylene monobutyl ether.

Here, the plasticizer and the lubricant are not necessarily contained in the mixed material powder depending on cases.

Upon preparing the wet mixture, a dispersant medium may be used, and with respect to the dispersant solution, examples thereof include: water, an organic solvent such as benzene, and alcohol such as methanol, and the like.

Moreover, a molding auxiliary may be added to the wet mixture.

With respect to the molding auxiliary, not particularly limited, examples thereof include: ethylene glycol, dextrin, fatty acid, fatty acid soap, polyalcohol and the like.

Furthermore, a pore forming agent, such as balloons that are fine hollow spheres composed of oxide-based ceramics, spherical acrylic particles and graphite, may be added to the above-mentioned wet mixture, if necessary.

With respect to the above-mentioned balloons, not particularly limited, for example, alumina balloons, glass microballoons, shirasu balloons, fly ash balloons (FA balloons), mullite balloons and the like may be used. Among these, alumina balloons are desirably used.

Here, with respect to the wet mixture using silicon carbide powder, prepared as described above, the temperature thereof is desirably about 28° C. or less. When the temperature is about 28° C. or less, the organic binder tends not to be gelated.

Moreover, the rate of organic components in the wet mixture is desirably set to about 10% by weight or less, and the content of moisture is desirably at least about 8.0% by weight and at most about 20.0% by weight.

The prepared wet mixture is then transported, and carried in a molding machine.

After the wet mixture transported by the transporting apparatus has been carried in the extrusion-molding machine, it is extrusion-molded into a honeycomb molded body having a predetermined shape.

Next, the resulting honeycomb molded body is dried by using a drying apparatus, such as a microwave drying apparatus, a hot-air drying apparatus, a dielectric drying apparatus, a reduced-pressure drying apparatus, a vacuum drying apparatus and a frozen drying apparatus, to prepare a dried honeycomb molded body.

Here, a cutting process is carried out on the resulting honeycomb molded body by using a cutting apparatus so that the two ends thereof are cut to prepare a honeycomb molded body having a predetermined length.

Next, a predetermined amount of plug material paste that forms plugs is filled into ends at the outlet side of a group of the inlet side cells and ends at the inlet side of a group of the outlet side cells, if necessary, so that predetermined cells are sealed. Upon sealing these cells, a sealing mask is made in contact with an end face (that is, cut face after the cutting process) of the honeycomb molded body, and the plug material paste is filled only into the cells that need to be plugged.

With respect to the plug material paste, although not particularly limited, those plug material pastes that allow the plugs manufactured through post processes to have a porosity of at least about 30% and at most about 75% are desirably used, and, for example, the same material as that of the wet mixture may be used.

The above-mentioned filling process of the plug material paste may be carried out on demand, and in the case where the plug material paste is filled, for example, the honeycomb structure obtained through the post processes can be desirably used as a honeycomb filter, while in the case where the plug material paste is not filled, for example, the honeycomb structure obtained through the post processes can be desirably used as a catalyst supporting member.

Next, in order to degrease the honeycomb molded body to which the plug material paste has been filled, the honeycomb molded body is transported to a degreasing furnace by using a degreasing furnace loading apparatus.

The degreasing furnace loading apparatus in accordance with the embodiments of the present invention, as explained above, is desirably used as a degreasing furnace loading apparatus in accordance with the embodiments to be used in the method for manufacturing a honeycomb structure in accordance with the embodiments of the present invention. The detailed structure of the degreasing furnace loading apparatus in accordance with the embodiments has already been explained; therefore, the description thereof is omitted.

The molded body moving mechanism desirably includes an arm including a suction mechanism capable of simultaneously suction-holding a plurality of honeycomb molded bodies.

Since the side faces of the honeycomb molded bodies are suction-held by the suction mechanism, the plurality of honeycomb molded bodies tend to be simultaneously placed on the degreasing jig without causing any damages to the end faces. Moreover, since the plurality of honeycomb molded bodies are simultaneously suction-held tend to be placed, all the honeycomb molded bodies that have been placed tend to be maintained almost in the same state, and a firing process tends to be carried out uniformly on the honeycomb molded body.

Moreover, the arm including the suction mechanism desirably has a suction force of at least about 0.4 kPa and at most about 2.0 kPa for each of the ceramic molded bodies.

The honeycomb molded body, prepared by drying a honeycomb molded body after the extrusion-molding process, has a certain degree of strength; however, since the strength is smaller than that of the honeycomb fired body that has been gone through a firing process, the honeycomb molded body is easily deformed so that, in order to prevent the suction-held honeycomb molded bodies from dropping while also preventing damages and the like to the honeycomb molded body due to the suction process, the honeycomb molded bodies are desirably suction-held by a suction force within the above-mentioned range.

Moreover, the molded body moving mechanism desirably includes a cushioning member at a contact portion with each of the honeycomb molded bodies. In particular, the cushioning member is desirably made of urethane. By attaching the cushioning member to the molded body moving mechanism in this manner, it may become easier to effectively prevent damages, deformation and the like to the honeycomb molded bodies.

Upon placing the plurality of honeycomb molded bodies on the degreasing jig, the interval between each of the honeycomb molded bodies is desirably at least about 3 mm and at most about 10 mm.

When the above-mentioned interval is about 3 mm or more, it may become easier to allow the degreasing process to progress, and in particular, adjacent honeycomb molded bodies may become mutually less susceptible to influences from moisture and gases that are generated upon degreasing the honeycomb molded bodies; consequently, it may not become difficult to carry out a uniform degreasing process. In contrast, when the interval is about 10 mm or less, the degreasing process tends not to progress excessively, and it may not become difficult to carry out a uniform degreasing process. Further, since the suction mechanism that includes a driving device used for adjusting the interval of the suction members tends not to have a larger size, the running costs as well as in the installation space in the entire apparatus tends not to increase, thereby facilitating effective utilization of the space inside the degreasing furnace.

The above-mentioned firing process is desirably carried out in a state that the degreased honeycomb molded bodies are placed on the degreasing jig.

In the case where the honeycomb molded bodies are fired while they are still placed on the degreasing jig, it may become easier to eliminate the necessity of providing a process and an apparatus used for re-placing the honeycomb molded bodies onto a jig for a firing process in a separate manner, and consequently to improve the efficiency of the entire manufacturing processes of a honeycomb structure. The degreasing jig is desirably made of a material that is resistant to the firing process, and for example, a carbon material and the like may be used.

The honeycomb molded bodies are carried in a degreasing furnace by using the degreasing furnace loading apparatus, and degreased under predetermined conditions (for example, when each honeycomb molded body has a size of about 34 mm×about 34 mm×about 15 mm to about 40 mm, the degreasing process is carried out at about 200° C. to about 500° C. for about 2 hours to about 4 hours, with an interval between each of the honeycomb molded bodies being set at about 5 mm to about 8 mm). Next, the honeycomb molded bodies which are still placed on the degreasing jig used for the degreasing process are fired (for example, at about 1400° C. to about 2300° C.) so that a honeycomb fired body which is made of a single fired body as a whole, which has a plurality of cells longitudinally placed in parallel with one another with a cell wall therebetween, and in which either one of the ends of each cell is plugged (see FIGS. 2A and 2B) can be manufactured.

With respect to the conditions of the degreasing and firing processes of the honeycomb molded body, conventional conditions that have been used upon manufacturing a filter made of a porous ceramic material may be adopted.

Next, a sealing material paste to form a sealing material layer (adhesive layer) is applied onto a side face of the honeycomb fired body with a uniform thickness to form a sealing material paste layer, and a process of laminating another honeycomb fired body on this sealing material paste layer is successively repeated so that an aggregate of honeycomb fired bodies having a predetermined size is manufactured.

With respect to the sealing material paste, examples thereof include a material including an inorganic binder, an organic binder, and at least one of inorganic fibers and inorganic particles, and the like.

With respect to the inorganic binder, for example, silica sol, alumina sol and the like may be used. Each of these may be used alone or two or more kinds of these may be used in combination. Among the inorganic binders, silica sol is desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is desirably used.

With respect to the inorganic fibers, examples thereof include ceramic fibers, such as silica-alumina, mullite, alumina, silica and the like. Each of these may be used alone or two or more kinds of these may be used in combination. Among the inorganic fibers, alumina fibers are desirably used.

With respect to the inorganic particles, examples thereof include carbides, nitrides and the like, and specific examples include inorganic powder or the like made of silicon carbide, silicon nitride and boron nitride. Each of these may be used alone, or two or more kinds of these may be used in combination. Among the inorganic particles, silicon carbide having superior thermal conductivity is desirably used.

Moreover, a pore forming agent, such as balloons that are fine hollow spheres composed of an oxide-based ceramic material, spherical acrylic particles and graphite, may be added to the above-mentioned sealing material paste, if necessary.

With respect to the above-mentioned balloons, not particularly limited, for example, alumina balloons, glass microballoons, shirasu balloons, fly ash balloons (FA balloons) and mullite balloons and the like may be used. Among these, alumina balloons are desirably used.

Next, this aggregate of honeycomb fired bodies is heated so that the sealing material paste layers are dried and solidified to form sealing material layers (adhesive layers).

Next, a cutting process is carried out on the aggregate of honeycomb fired bodies in which a plurality of honeycomb fired bodies have been bonded to one another by interposing sealing material layers (adhesive layers) by using a diamond cutter or the like so that a cylindrical honeycomb block is manufactured.

Then, a sealing material layer (coat layer) is formed on the periphery of the honeycomb block by using the above-mentioned sealing material paste so that a honeycomb structure in which a sealing material layer (coat layer) is formed on the periphery of a cylindrical honeycomb block having a structure in which a plurality of honeycomb fired bodies are bound to one another by interposing sealing material layers (adhesive layers) is manufactured.

Thereafter, a catalyst is supported on the honeycomb structure on demand. The supporting process of the catalyst may be carried out on the honeycomb fired bodies prior to being formed into an aggregate.

In the case where a catalyst is supported thereon, an alumina film having a high specific surface area is desirably formed on the surface of the honeycomb structure, and a co-catalyst and a catalyst such as platinum are applied onto the surface of the alumina film.

With respect to the method for forming the alumina film on the surface of the honeycomb structure, for example, a method in which the honeycomb structure is impregnated with a solution of a metal compound containing aluminum such as $Al(NO_3)_3$ and then heated, and a method in which the honeycomb structure is impregnated with a solution containing alumina powder and then heated, are proposed.

With respect to the method for applying a co-catalyst to the alumina film, for example, a method in which the honeycomb structure is impregnated with a solution of a metal compound containing a rare-earth element, such as $Ce(NO_3)_3$, and then heated is proposed.

With respect to the method for applying a catalyst to the alumina film, for example, a method in which the honeycomb structure is impregnated with a solution of dinitro diammine platinum nitric acid ($[Pt(NH_3)_2(NO_2)_2]HNO_3$, platinum concentration: about 4.53% by weight) and then heated is proposed.

Moreover, a catalyst may be applied through a method in which after the catalyst has been preliminarily applied to alumina particles, the honeycomb structure is impregnated with a solution containing the alumina powder bearing the catalyst applied thereto, and then heated.

Here, the honeycomb structure manufactured through the above-mentioned method for manufacturing a honeycomb structure in accordance with the embodiments of the present invention is an aggregated honeycomb structure in which a plurality of honeycomb fired bodies are bound to one another by interposing sealing material layers (adhesive layers); however, the honeycomb structure to be manufactured by the manufacturing method in accordance with the embodiments of the present invention may be an integral honeycomb structure in which a pillar-shaped honeycomb block is configured by one honeycomb fired body. With respect to the main constituent material for the integral honeycomb structure, cordierite and aluminum titanate are desirably used.

Upon manufacturing such an integral honeycomb structure in accordance with the embodiments of the present invention, first, a honeycomb molded body is formed by using the same method as the manufacturing method for an aggregated honeycomb structure except that the size of a honeycomb molded body to be molded through the extrusion-molding process is greater than that of the aggregated honeycomb structure.

In the same manner as the method for manufacturing the aggregated honeycomb structure, the honeycomb molded body is dried by using a drying apparatus, such as a microwave drying apparatus, a hot-air drying apparatus, a dielectric drying apparatus, a reduced-pressure drying apparatus, a vacuum drying apparatus and a frozen drying apparatus.

Next, a cutting process is carried out on the dried honeycomb molded body so that the two end portions thereof are cut.

Next, a predetermined amount of plug material paste that forms plugs is filled into ends at the outlet side of a group of the inlet side cells and ends at the inlet side of a group of the outlet side cells so that predetermined cells are sealed.

Thereafter, in the same manner as the manufacturing processes of the aggregated honeycomb structure, the degreasing and firing processes are carried out to manufacture a honeycomb block, and by forming a sealing material layer (coat layer), if necessary, an integral honeycomb structure can be manufactured. Moreover, a catalyst may be supported on the integral honeycomb structure by using the above-mentioned method in the same manner.

In the method for manufacturing a honeycomb structure in accordance with the embodiments of the present invention as explained above, it may become easier to manufacture a honeycomb structure by using highly efficient operations.

Upon degreasing honeycomb molded bodies, a plurality of honeycomb molded bodies are desirably transferred under the same conditions as much as possible, and degreased. In the mount-type transferring device described in JP-B 3-035057, however, honeycomb structural products are transferred one by one by the rotation movement of the movable arm; thus, it may become more difficult to transfer a plurality of honeycomb structural products under the same conditions, and since the layout of the honeycomb molded bodies after the transferring process has not been taken into consideration, this apparatus is not adequate to a loading device to a degreasing furnace so as to carry out a degreasing process under the same conditions.

Moreover, in accordance with the embodiments of the present invention, in the case where a honeycomb structure is manufactured through the above-mentioned method, since, upon carrying the honeycomb molded body into a degreasing furnace, the plurality of honeycomb molded bodies tend to be simultaneously placed on a degreasing jig, thereby more easily carrying out a degreasing process under almost the same conditions, it may become easier to efficiently achieve a shortened process time, uniform quality and the like. Moreover, since after the degreasing process, a firing process can be carried out continuously, the sequence of working processes tends to be formed into a streamline form so that a further efficient operation may be achieved more easily. Therefore, the method for manufacturing a honeycomb structure in accordance with the embodiments of the present invention may make it easier to improve the efficiency of the entire manufacturing processes.

Here, the above description has mainly discussed a honeycomb filter used for collecting (purifying) particulates in exhaust gases as the honeycomb structure; however, the above-mentioned honeycomb structure can also be desirably used as a catalyst supporting member (honeycomb catalyst) that purifies (converts) exhaust gases.

EXAMPLES

The following description will discuss the present invention in detail by means of examples; however, the present invention is not intended to be limited only to these examples.

In the method for manufacturing a honeycomb structure in accordance with the embodiments of the present invention, upon placing honeycomb molded bodies on a degreasing jig by the use of the degreasing furnace loading apparatus in accordance with the embodiments of the present invention, observation was carried out as to how the state of the honeycomb fired body after the firing process would be changed by changing the suction force for suction-holding the honeycomb molded bodies in the degreasing furnace loading apparatus as well as by the presence or absence of the cushioning member.

Example 1

Powder of α-type silicon carbide having an average particle size of 10 μm (250 kg), powder of α-type silicon carbide having an average particle size of 0.5 μm (100 kg) and an organic binder (methyl cellulose) (20 kg) were mixed to prepare mixed powder.

Next, separately, a lubricant (UNILUB, made by NOF Corp.) (12 kg), a plasticizer (glycerin) (5 kg) and water (65 kg) were mixed to prepare a liquid mixture, and this liquid mixture and the mixed powder were mixed by using a wet-type mixing machine so that a wet mixture was prepared.

The moisture content of the wet mixture thus prepared was 14% by weight.

Next, this wet mixture was transported to an extrusion-molding machine by using a transporting apparatus, and charged into a material loading port of an extrusion-molding machine.

Here, the moisture content of the wet mixture immediately before the loading process into the extrusion-molding machine was 13.5% by weight.

The wet mixture was then extrusion-molded into a molded body having a shape (without scaling of cells) as shown in FIGS. 2A and 2B.

Next, after the raw molded body had been dried by using a microwave drying apparatus or the like, a plug material paste having the same composition as the wet mixture was filled into predetermined cells. The honeycomb molded body to which the plug material paste had been filled was again dried by using a drying apparatus, and the honeycomb molded body that had been dried was then carried in a degreasing furnace by using a degreasing furnace loading apparatus shown in FIG. 3.

Here, the degreasing furnace loading apparatus used in this case included a cushioning member made of urethane.

More specifically, the dried honeycomb molded bodies, transported by a conveyer, were placed in a state where they were made in contact with one another, on a molded body receiving unit, and a suction mechanism was then lowered so that a suction plate having the cushioning member made of urethane was made in contact with the honeycomb molded bodies.

Next, the suction device was operated so that each of honeycomb molded bodies was suction-held by a suction force of 1.2 kPa.

Here, the weight of each of honeycomb molded bodies was 210 g.

After the suction mechanism had been raised to a predetermined position by an elevating mechanism, the arm was shifted above the degreasing jig by an arm moving device. Here, the interval between each of the honeycomb molded bodies as widened to 6.0 mm by using a driving device.

Next, the suction mechanism was lowered until the honeycomb molded bodies had been made in contact with the degreasing jig, and the honeycomb molded bodies were then released from the suction state by stopping the driving operation of the suction device so that the honeycomb molded bodies were mounted on the degreasing jig. Lastly, a transporting table was activated so that the degreasing jig on which the honeycomb molded bodies were mounted was carried in the degreasing furnace.

The honeycomb molded bodies, carried in the degreasing furnace, were degreased at 400° C., and the degreasing jig on which the honeycomb molded bodies were mounted was carried in a firing furnace, and firing was carried out at 2200° C. in a normal-pressure argon atmosphere for 3 hours, to manufacture honeycomb fired bodies, each of which was a silicon carbide sintered body and had a porosity of 40%, an average pore diameter of 12.5 μm, a size of 34.3 mm×34.3 mm×250 mm, the number of cells (cell density) of 46.5/cm² and a thickness of each cell wall of 0.20 mm.

Examples 2 to 4

Honeycomb fired bodies were manufactured by the same processes as Example 1, except that the suction force to each of the honeycomb molded bodies was set to a value shown in Table 1.

Example 5

Honeycomb fired bodies were manufactured by the same processes as Example 1, except that the honeycomb molded bodies were suction-held by using the suction plate without the cushioning members.

(Observation on State of Honeycomb Fired Bodies)

With respect to the honeycomb fired bodies manufactured in Examples 1 to 5, the surface state was visually observed for occurrence of any deformation, damage and the like.

Here, in the observation of the surface state, those in which neither deformation nor damage was found were evaluated as "⊚", those in which deformations and damages were slightly observed were evaluated as "○" and those in which deformations and damages that would seriously impair the quality of the products were observed were evaluated as "x".

The results are shown in Table 1 below.

TABLE 1

| | Interval between each of honeycomb molded bodies (mm) | Suction force (kPa) | Cushioning member | Surface state |
|---|---|---|---|---|
| Example 1 | 6.0 | 1.2 | Present | ⊚ |
| Example 2 | 6.0 | 0.7 | Present | ⊚ |
| Example 3 | 6.0 | 1.7 | Present | ⊚ |
| Example 4 | 6.0 | 2.5 | Present | ○ |
| Example 5 | 6.0 | 1.2 | Not present | ○ |

As clearly indicated by Table 1, the honeycomb fired bodies manufactured in Examples 1 to 3 were free from deformations and damages, and had a good surface state. The honeycomb fired bodies, manufactured in Examples 4 and 5, had slight deformations occurring on the side face; however, these were sufficiently applicable as products.

With respect to the reasons for the occurrence of slight deformations in Examples 4 and 5, in addition to the fact that the honeycomb molded bodies were soft, the following reasons are listed. In other words, in Example 4, the suction force to each of the honeycomb molded bodies was set at 2.5 kPa during the manufacturing process. Thus, a suction force exceeding the endurance strength was imposed on the side face. In Example 5, since the suction plate did not include cushioning members, an excessive impact was applied to the side face when the suction plate and the honeycomb molded bodies were made in contact with each other.

In the case where the suction process was carried out by setting the suction force to the honeycomb molded bodies at 0.3 kPa, it was sometimes not possible to carry out the suction process on the honeycomb molded bodies, or even if the honeycomb molded bodies were suction-held, the honeycomb molded bodies sometimes dropped off in the middle of the shifting process; consequently, it was not possible to surely place the honeycomb molded bodies on the degreasing jig. Those honeycomb molded bodies that had dropped off had damages and deformations therein, and could not be used again. This shows that the suction force to each of the honeycomb molded bodies is desirably at least 0.4 kPa.

Examples 6 to 20

The same processes as Example 1 were carried out to manufacture honeycomb fired bodies except for the following points:

(i) The dimension of the cross section of the honeycomb molded body formed into a square pillar shape through extrusion-molding was set at each of values shown in Table 2 below, and, upon placing the honeycomb molded bodies on the degreasing jig by using the suction mechanism, the interval between each of the honeycomb molded bodies was set at each of values shown in Table 2;

(ii) The honeycomb molded bodies were degreased by using a degreasing furnace having a size of 850 mm in width× 1500 mm in height×23000 mm in length, while the degreasing jig was being allowed to pass through the inside of the degreasing furnace that was set at the maximum temperature of 300° C. in a normal-pressure nitrogen atmosphere (oxygen concentration: 9 vol %), at a conveyor speed of 140 mm/min; and (iii) The honeycomb molded bodies were fired by using a firing furnace having a size of 1800 mm in width×1600 mm in height×29000 mm in length, while a degreasing jig (the degreasing jig may be used as a firing jig) was being allowed to pass through the inside of the firing furnace that was set at the maximum temperature of 2200° C. in a normal-pressure argon atmosphere, at an average conveyor speed of 38 mm/min (460 mm shift for every 12 minutes).

(Measurements on Average Pore Diameter and Breaking Load of Honeycomb Fired Bodies)

With respect to each of honeycomb fired bodies manufactured in Examples 6 to 20, the average pore diameter and breaking load were measured, and effects of the interval for placing between each of the honeycomb molded bodies placed inside the degreasing jig to be given to the above-mentioned factors were evaluated.

With respect to the average pore diameter, a cube having 1 cm in each side was cut out from each of the honeycomb fired bodies to prepare a sample, and the fine-pore distribution was measured in a range of the fine-pore diameter from 0.2 to 500 μm, by using a fine-pore distribution measuring device (Auto-Pore III9405, made by Shimadzu Corp.) in which a mercury injection method is adopted, in compliance with JIS R 1655, and the average fine-pore diameter at this time was calculated as (4 V/A) so that the average pore diameter was calculated. Here, the number of samples was 1 (N=1), and the set value of the average pore diameter was 11.0 μm.

Figure 5:
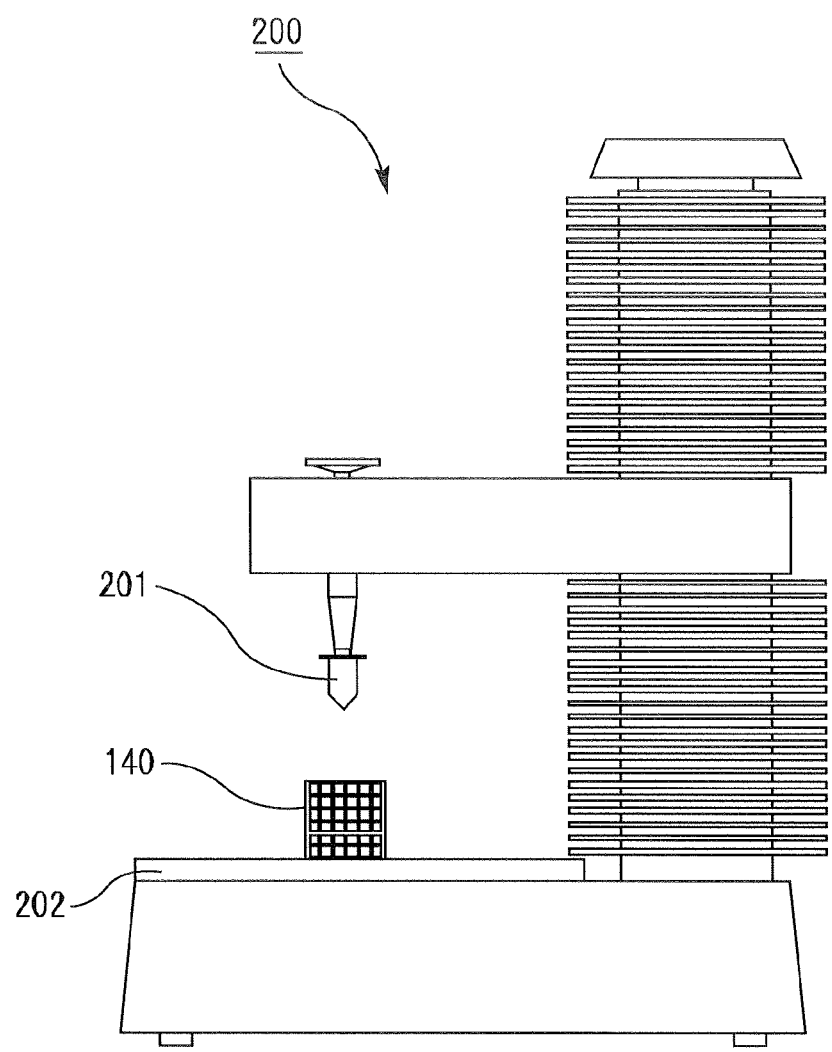
FIG. 5 is a schematic view that shows a texture analyzer.

Moreover, with respect to the breaking load, by using a texture analyzer TA-XT2i (STABLE MICRO SYSTEM Co., Ltd.) shown in FIG. 5, the breaking strength was evaluated by using the following method.

In other words, a honeycomb fired body was placed on a measuring table 202 of the texture analyzer 200 shown in FIG. 5 with its side face facing up, and a probe 201 was then lowered onto the side face forming an upper face at a speed of 0.5 mm/s so that the compression load at the time of breaking was measured. Here, with respect to the probe 201, a probe (made of stainless steel), had a shape in which a cone body with a top of 90° was secured to the tip of a cylindrical member of 15 mmφ, with the overall length of 50 mm, was used.

Figure 6A:
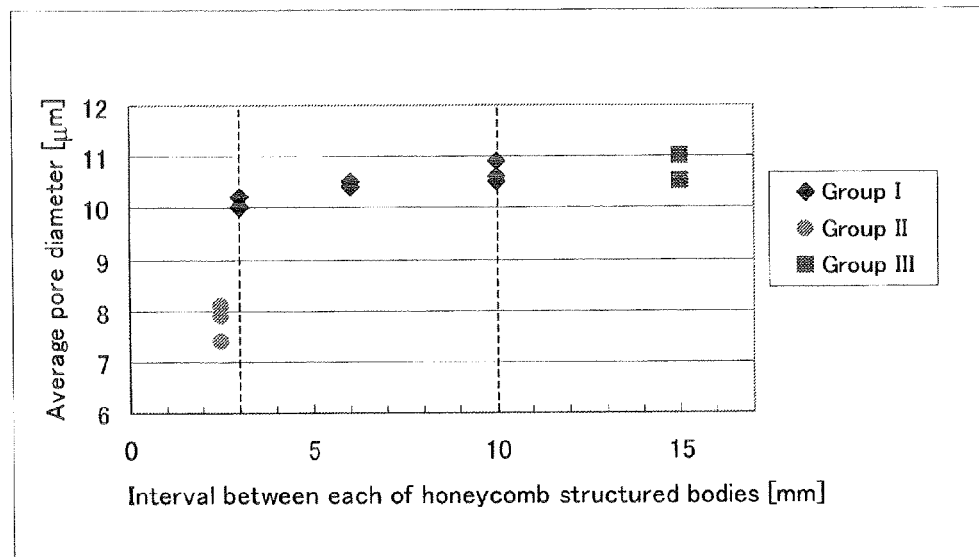
FIG. 6A is a graph showing the relationship between interval and average pore diameter in the honeycomb structures according to Examples 6 to 20.
Figure 6B:
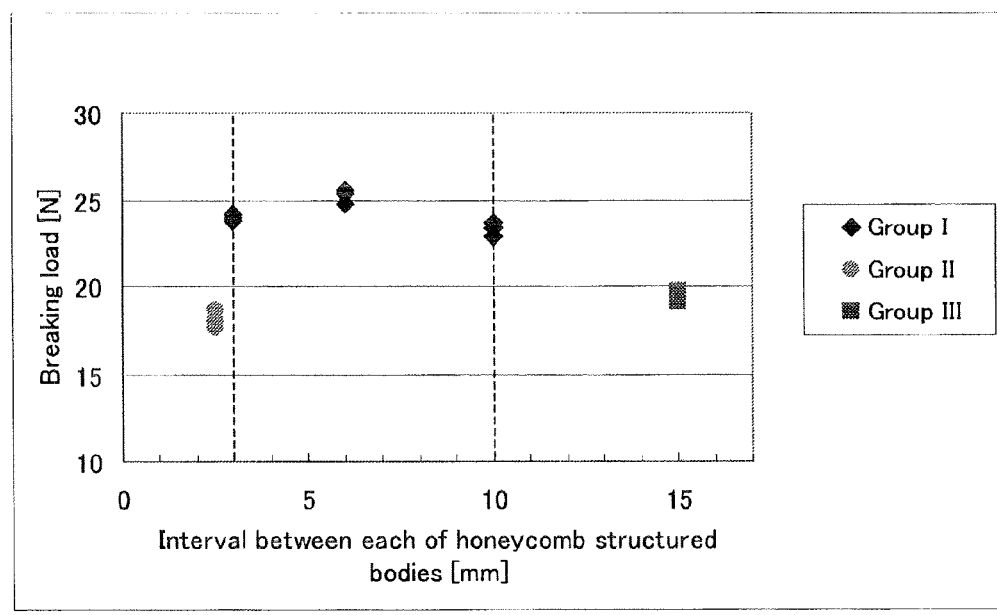
FIG. 6B is a graph showing the relationship between intervals and breaking load in the honeycomb structures according to Examples 6 to 20.

The results thereof are shown in Table 2, FIGS. 6A and 6B. FIG. 6A is a graph showing the relationship between interval and average pore diameter in the honeycomb structures according to Examples 6 to 20, and FIG. 6B is a graph showing the relationship between intervals and breaking load in the honeycomb structures according to Examples 6 to 20.

The contents of JIS R 1655 are incorporated herein by reference in its entirety.

As clearly indicated by Table 2, and FIGS. 6A and 6B, in any of the honeycomb fired bodies manufactured in Examples 6 to 20, good results were obtained with respect to the average pore diameter and breaking load. In particular, in Examples 7 to 9, Examples 12 to 14, as well as Examples 17 to 19 (which are referred to as Group I of Examples), good results were obtained with respect to both of the average pore diameter and breaking load, regardless of the cross-sectional dimension of each of the honeycomb molded bodies; thus, it was clearly found that honeycomb fired bodies having predetermined quality were manufactured.

With respect to honeycomb fired bodies according to Examples 6, 11 and 16 (which are referred to as Group II of Examples), although they are applicable as products without causing problems, they had an average pore diameter of a value of about 2 to 3 μm smaller than that of Group I, and also had a breaking load of a value of about 4 to 6 N smaller than that of Group I.

The reason for this is explained as follows. In Group II, since the degreasing process was carried out with an interval between each of honeycomb molded bodies being set at 2.5 mm, it became difficult to allow the degreasing process to progress and it was not possible to carry out the degreasing process uniformly due to influences from moisture and gases generated from the honeycomb molded bodies upon degreasing.

Moreover, in honeycomb fired bodies manufactured in Examples 10, 15 and 20 (which are referred to as Group III of Examples), good values were obtained with respect to the average pore diameter. However, with respect to the breaking load, the resulting value was lowered in comparison with Group I, although it was in a range that allows the honeycomb fired bodies to be sufficiently applied as products.

The reason for this is explained as follows. In Group III differently from Group I, since the degreasing process was carried out with an interval between each of honeycomb molded bodies being set at 15.0 mm, the degreasing process progressed excessively, making it difficult to carry out the degreasing process uniformly.

As described above, the honeycomb molded bodies were carried in a degreasing furnace by using the degreasing furnace loading apparatus of the present invention, and then fired so that it became possible to manufacture honeycomb fired bodies that have superior properties in the average pore diameter and the breaking load. Moreover, the results of Examples

TABLE 2

|  | Cross-sectional dimension of honeycomb molded body (mm) | Interval between each of honeycomb molded bodies (mm) | Suction force (kPa) | Cushioning member | Average pore diameter (μm) | Breaking load (N) |
| --- | --- | --- | --- | --- | --- | --- |
| Example 6 | 18 × 18 | 2.5 | 1.2 | Present | 7.4 | 18.6 |
| Example 7 | 18 × 18 | 3.0 | 1.2 | Present | 10.2 | 24.0 |
| Example 8 | 18 × 18 | 6.0 | 1.2 | Present | 10.5 | 25.3 |
| Example 9 | 18 × 18 | 10.0 | 1.2 | Present | 10.6 | 22.9 |
| Example 10 | 18 × 18 | 15.0 | 1.2 | Present | 10.5 | 19.1 |
| Example 11 | 34 × 34 | 2.5 | 1.2 | Present | 8.1 | 18.0 |
| Example 12 | 34 × 34 | 3.0 | 1.2 | Present | 10.2 | 24.2 |
| Example 13 | 34 × 34 | 6.0 | 1.2 | Present | 10.4 | 25.5 |
| Example 14 | 34 × 34 | 10.0 | 1.2 | Present | 10.9 | 23.4 |
| Example 15 | 34 × 34 | 15.0 | 1.2 | Present | 11.0 | 19.5 |
| Example 16 | 50 × 50 | 2.5 | 1.2 | Present | 7.9 | 17.6 |
| Example 17 | 50 × 50 | 3.0 | 1.2 | Present | 10.0 | 23.8 |
| Example 18 | 50 × 50 | 6.0 | 1.2 | Present | 10.4 | 24.8 |
| Example 19 | 50 × 50 | 10.0 | 1.2 | Present | 10.5 | 23.7 |
| Example 20 | 50 × 50 | 15.0 | 1.2 | Present | 10.5 | 19.7 | according to Groups I to III indicate that the interval for placing between each of the placed honeycomb molded bodies during the degreasing process formed a main factor. Moreover, it was found that the placing interval was desirably 3.0 to 10.0 mm.

In this manner, by carrying in honeycomb molded bodies into a degreasing furnace by using the degreasing furnace loading apparatus of the present invention, it may become easier to efficiently place the honeycomb molded bodies on a degreasing jig to have appropriate intervals between each of them while preventing the occurrence of deformation and damage to the honeycomb molded bodies, and consequently to improve the efficiency of the manufacturing processes of a honeycomb structure. Moreover, it may become easier to efficiently manufacture products in which the pore diameter after the firing process is maintained at a value as designed, and also to allow the manufactured honeycomb fired bodies to have a superior breaking load.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, said method comprising:
    forming a plurality of honeycomb molded bodies having a plurality of cells longitudinally placed in parallel with one another with a partition wall therebetween by molding a ceramic raw material;
    carrying the plurality of honeycomb molded bodies into a degreasing furnace by using a degreasing furnace loading apparatus, wherein the degreasing furnace loading apparatus comprises: a molded body moving mechanism comprising an arm capable of moving; and a transporting table that transports a degreasing jig for mounting the plurality of honeycomb molded bodies thereon to the degreasing furnace, wherein said molded body moving mechanism includes a plurality of suction members and suction plates having suction holes at two positions; a driving device comprising a plurality of hooking portions which are formed on the two ends of each of said suction members; and a plurality of binding rings, wherein a spring is interposed between said suction member and said suction plate, adjacent two of said hooking portions is formed into one set, and said binding ring is hooked on said hooking portions for each set,
    degreasing the plurality of honeycomb molded bodies in the degreasing furnace; and
    firing the degreased honeycomb molded bodies so that a honeycomb structure comprising at least a single piece of a honeycomb fired body is manufactured,
    wherein the carrying of the plurality of honeycomb molded bodies into a degreasing furnace includes:
    suction-holding the plurality of honeycomb molded bodies by said plurality of suction members and suction plates having suction holes at two positions;
    adjusting intervals between each of said suction plates equal to one another with the plurality of honeycomb molded bodies by said driving device;
    moving said arm above said degreasing jig;
    placing the plurality of honeycomb molded bodies simultaneously on the degreasing jig by suspending said suction-holding, each of said plurality of honeycomb molded bodies being placed to have predetermined equal intervals therebetween; and
    transporting the degreasing jig into the degreasing furnace using the transporting table.

2. The method for manufacturing a honeycomb structure according to claim 1, wherein the suction mechanism can provide a suction force of at least about 0.4 kPa and at most about 2.0 kPa to each of said the plurality of honeycomb molded bodies.

3. The method for manufacturing a honeycomb structure according to claim 1, wherein a suction face of each honeycomb molded body of the plurality of honeycomb molded bodies on which the suction mechanism works is a side face of the honeycomb molded body.

4. The method for manufacturing a honeycomb structure according to claim 1, wherein the molded body moving mechanism includes a cushioning member at a contact portion with each of said plurality of honeycomb molded bodies.

5. The method for manufacturing a honeycomb structure according to claim 4, wherein the cushioning member is made of a material selected from urethane resin, polyethylene resin, polypropylene resin, polystyrene resin, rubber, and epoxy resin.

6. The method for manufacturing a honeycomb structure according to claim 4, wherein the cushioning member is attached to an entire contact face of the contact portion.

7. The method for manufacturing a honeycomb structure according to claim 1, wherein, upon placing the plurality of honeycomb molded bodies on the degreasing jig, an interval between each of the honeycomb molded bodies is at least about 3 mm and at most about 10 mm.

8. The method for manufacturing a honeycomb structure according to claim 1, wherein said firing is carried out in a state that the degreased honeycomb molded body is placed on the degreasing jig.

9. The method for manufacturing a honeycomb structure according to claim 1, wherein the honeycomb molded body has predetermined cells filled with a plug material paste and then plugged.

10. The method for manufacturing a honeycomb structure according to claim 1, wherein the honeycomb structure is formed by a plurality of honeycomb fired bodies combined with one another by interposing a sealing material layer.

11. The method for manufacturing a honeycomb structure according to claim 1, wherein the honeycomb structure is formed by a single piece of the honeycomb fired body.

12. The method for manufacturing a honeycomb structure according to claim 1,
    wherein
    said molded body moving mechanism has one of a ball screw which shifts said arm in a horizontal direction and a crane which moves said arm horizontally along a rail.

13. The method for manufacturing a honeycomb structure according to claim 1,
    wherein
    said molded body moving mechanism further comprises:
    a supporting member for an arm which supports said arm; and
    a revolution mechanism capable of rotating; and
    said revolution mechanism is provided to further upper portion of said supporting member for an arm.

14. The method for manufacturing a honeycomb structure according to claim 1,
    wherein
    said suction members and said suction plates are placed in parallel with each other so as to be made face to face with each other in a horizontal direction.

* * * * *